United States Patent
Choi

(10) Patent No.: US 7,790,984 B2
(45) Date of Patent: Sep. 7, 2010

(54) APPARATUS FOR CONTROLLING CABLE OF ROBOT

(76) Inventor: Kwang Sul Choi, 3-1313, Dongdeok Hyundai Apt. 329, Boksan-dong, Jung-gu, Ulsan 681-752 (KR)

( * ) Notice: Subject to any disclaimer, the term of this patent is extended or adjusted under 35 U.S.C. 154(b) by 262 days.

(21) Appl. No.: 12/085,452

(22) PCT Filed: Mar. 27, 2007

(86) PCT No.: PCT/KR2007/001493
§ 371 (c)(1),
(2), (4) Date: Jun. 17, 2008

(87) PCT Pub. No.: WO2007/111467
PCT Pub. Date: Oct. 4, 2007

(65) Prior Publication Data
US 2009/0255711 A1  Oct. 15, 2009

(30) Foreign Application Priority Data
Mar. 28, 2006  (KR) ...................... 10-2006-0027936

(51) Int. Cl.
*H01B 7/00* (2006.01)
(52) U.S. Cl. .................... 174/135; 174/72 A; 174/68.1; 248/51; 219/125.1; 901/49
(58) Field of Classification Search ............ 174/135, 174/68.1, 72 A, 69, 108; 219/125.1; 248/49, 248/51; 439/358; 901/49
See application file for complete search history.

(56) References Cited

U.S. PATENT DOCUMENTS

| | | | | |
|---|---|---|---|---|
| 4,815,011 A | * | 3/1989 | Mizuno et al. | 700/264 |
| 4,931,617 A | * | 6/1990 | Toyoda et al. | 219/125.1 |
| 5,760,560 A | * | 6/1998 | Ohya et al. | 318/568.1 |
| 5,777,267 A | * | 7/1998 | Szydel | 174/72 A |
| 7,001,200 B2 | * | 2/2006 | Yoshie | 439/358 |
| 2006/0000817 A1 | | 1/2006 | Inoue et al. | |

FOREIGN PATENT DOCUMENTS

| | | |
|---|---|---|
| JP | 5-60669 | 8/1993 |
| JP | 2557404 | 8/1997 |
| KR | 10-1999-0035012 | 5/1999 |
| KR | 20-0395697 | 9/2005 |

* cited by examiner

*Primary Examiner*—Dhiru R Patel
(74) *Attorney, Agent, or Firm*—Park & Associates IP Law LLC

(57) ABSTRACT

The cable control apparatus includes a body disposed above the arm and a fixing ring having a through-hole fixed in the conveying hole; a conveying ring; a cable tube for integrally housing a plurality of control cables and including one end connected to the conveying ring with being inserted into the conveying hole of the body and the other end connected to the head of the industrial robot through the through-hole of the fixing ring; and a elastic member externally inserted to the cable tube and including one end connected to the fixing ring and the other end connected to the conveying ring for returning the cable tube to an original position through elastic force after the conveying ring slides the cable tube in order to sustain the cable tube between the arm and head not to be loosen.

3 Claims, 3 Drawing Sheets

[Fig. 4]
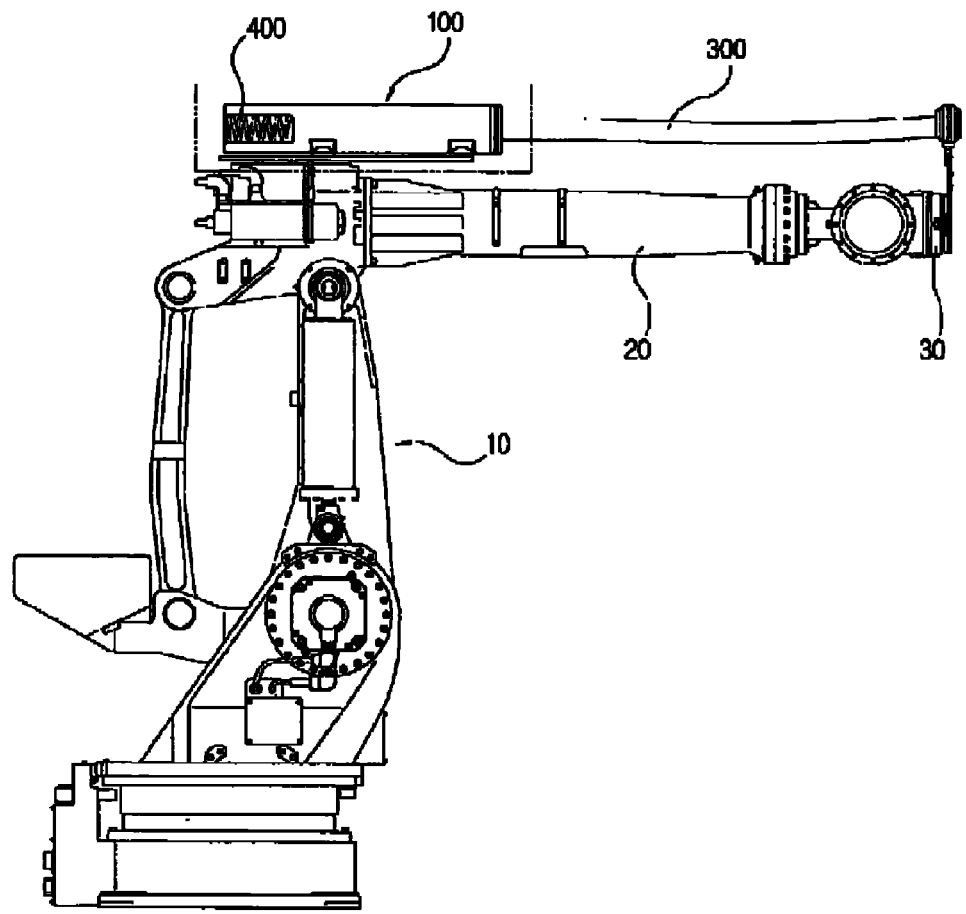
[Fig. 5]
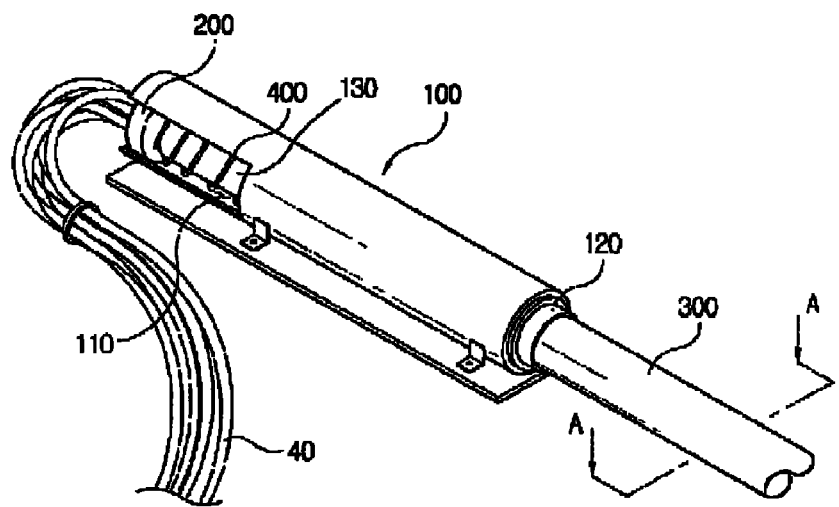

[Fig. 6]
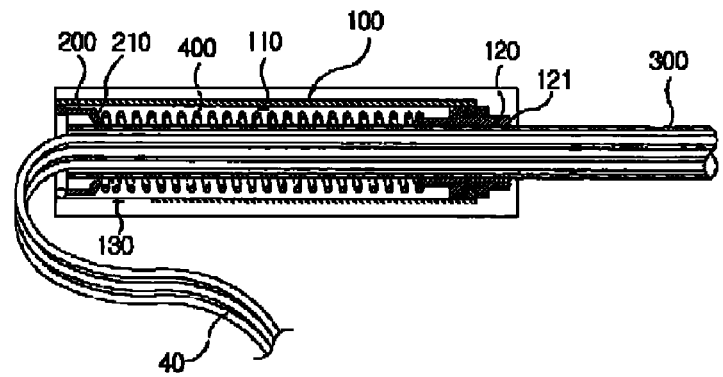
[Fig. 7]
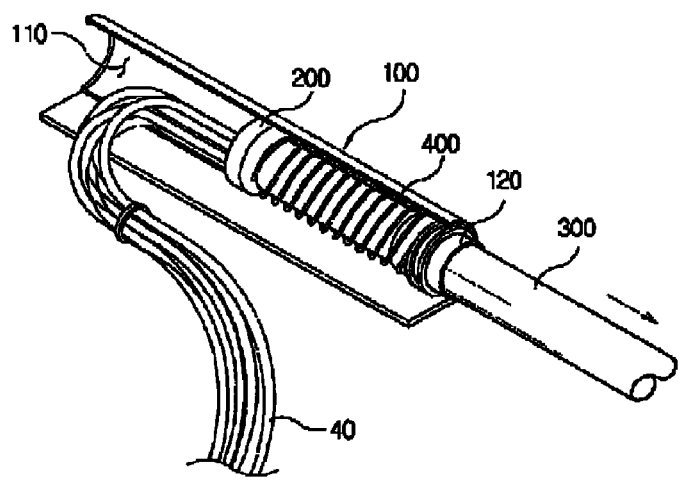
[Fig. 8]
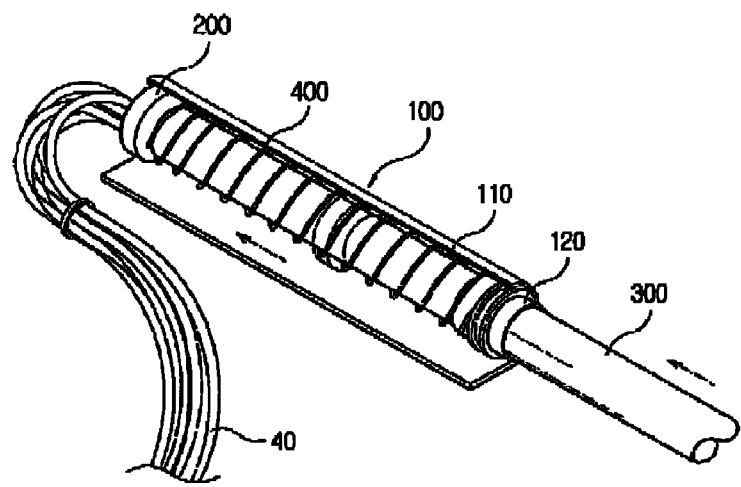

APPARATUS FOR CONTROLLING CABLE OF ROBOT

TECHNICAL FIELD

The present invention relates to an apparatus for controlling cables, and more particularly, to a cable control apparatus for sustaining cables, which are installed at an industrial robot for operating the industrial robot, not to be loosen.

BACKGROUND ART

In general, an industrial robot includes an arm for making various motions and a head disposed at one end of the arm for mounting various tools. Furthermore, the industrial robot includes a plurality of cables disposed along the outside of the arm and connected to the head in order to supply electric power or control signals. For example, the cables include a power cable, a control cable, and a water cable.

Although the industrial robot is controlled through a plurality of the cables, the cables disturb the arm to make certain motions because the cables are disposed along the outside of the arm. In order to prevent the cables from disturbing the arm to make motions, a cable tube was used. That is, the cables disposed between the arm and the head are combined into the cable tube, and the cables are disposed along the arm with the cable tube not to disturb the operation of the robot 10 with in an operating radius of the robot 10.

The cable tube 4 of the industrial robot 1 extends and contracts according to the motion of the head 3. When the head 3 connected to the arm 2 of the industrial robot 1 is in an initial state before a rotation motion is made, the cable tube 4 is strained without being loosen. When the head 3 of the industrial robot 1 makes motions, the cable tube 4 between the arm 2 and the head 3 becomes loosen because the cable tube 4 is pulled to the head as much as a radius of the rotation motion.

After the cable tube 4 between the head 3 and the arm is pulled to the head 3, the cable tube 4 is not restored to an original state. Therefore, the cable tube 4 between the head 3 and the arm 2 becomes loosen. The loosen cable tube 4 is entangled or bended when the industrial robot 1 is operated. Therefore, the cables in the entangled or bended cable tube may be damaged.

DISCLOSURE OF INVENTION

Technical Problem

It is, therefore, an object of the present invention to provide a cable control apparatus for preventing a cable tube disposed between an arm and a head of an industrial robot from being loosen not to be entangled or bended so that cables is protected from being damaged.

Technical Solution

In accordance with one aspect of the present invention, there is a cable control apparatus for preventing a plurality of cables, which are disposed between an arm and a head of the industrial robot, from being entangled or bended to protect the cables from being damaged, the cable control apparatus including: a body disposed above the arm and including a conveying hole formed in a length direction and a fixing ring having a through-hole fixed in the conveying hole; a conveying ring slidably disposed in the conveying hole of the body and including a through-hole internally inserted therein; a cable tube for integrally housing a plurality of control cables and including one end connected to the conveying ring with being inserted into the conveying hole of the body and the other end connected to the head of the industrial robot through the through-hole of the fixing ring; and a elastic member externally inserted to the cable tube and including one end connected to the fixing ring and the other end connected to the conveying ring for returning the cable tube to an original position through elastic force after the conveying ring slides the cable tube in order to sustain the cable tube between the arm and head not to be loosen.

A jamming prevention groove may be formed at a rear end of the body in a length direction and the jamming prevention groove communicates with the conveying hole.

The elastic member may be a spring having elastic force.

Advantageous Effects

A cable control apparatus according to the present invention prevents a cable tube, which houses control cables between an arm and a head of a robot, from being loosen by restoring the cable tube to an original state using elastic force after the cable tube is pulled by the operation of the head. Therefore, the cables are prevented from being damaged by preventing the cables not to be entangled or bended.

As described above, although the present invention has been described and illustrated with reference to preferred embodiments and drawings, it should be understood that various modifications and variations of the present invention can be made thereto by those skilled in the art without departing from the spirit and the technical scope of the present invention as defined by the appended claims.

BRIEF DESCRIPTION OF THE DRAWINGS

The above and other objects and features of the present invention will become apparent from the following description of the preferred embodiments given in conjunction with the accompanying drawings, in which:

FIG. 4 is a cross-sectional view of a cable control apparatus of an industrial robot according to an embodiment of the present invention;

FIG. 5 is a perspective view of a cable control apparatus of an industrial robot according to an embodiment of the present invention;

FIG. 6 is a cross-section view of FIG. 5 taken along the line A-A; and

FIGS. 7 and 8 are diagrams illustrating the cable control apparatus of FIG. 5 in operation.

BEST MODE FOR CARRYING OUT THE INVENTION

Figure 1:
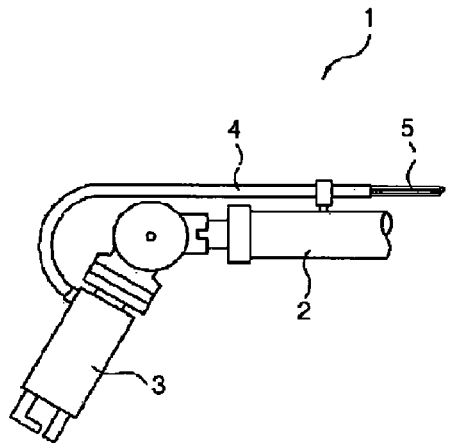
FIGS. 1 to 3 are diagrams illustrating cables when an industrial robot operates according to the related art.
Figure 2:
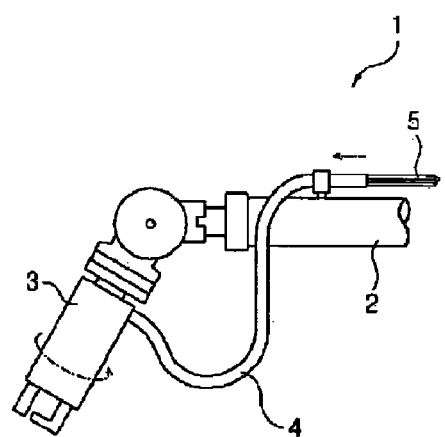
Figure 3:
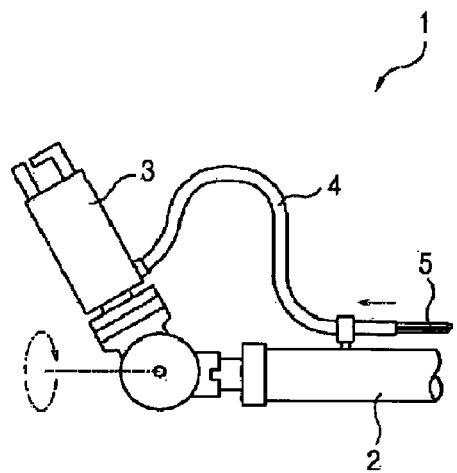

Other objects and aspects of the invention will become apparent from the following description of the embodiments with reference to the accompanying drawings, which is set forth hereinafter.

FIG. 4 is a cross-sectional view of a cable control apparatus of an industrial robot according to an embodiment of the present invention, FIG. 5 is a perspective view of a cable control apparatus of an industrial robot according to an embodiment of the present invention, and FIG. 6 is a cross-section view of FIG. 5 taken along the line A-A.

Referring to FIG. 4 to FIG. 6, the cable control apparatus according to the present embodiment includes a body, a convey ring 200, a cable tube 300, and an elastic member 400.

The body 100 is a pipe shaped member formed at an upper rear edge of the industrial robot 10 in a length direction and includes a conveying hole 110.

A jamming prevention groove 130 is formed at one side edge of the body 10, for example, at a front end of the body 100, in a length direction. The jamming prevention groove 130 communicates with the conveying hole 110.

In the conveying hole 110, a fixing ring 120 is fixed at the other end of the body 100, for example, the rear end of the body 100, in the length direction 100. The fixing ring 120 includes a through-hole 121.

The jamming prevention groove 130 prevents the cables 40 from being damaged when a plurality of the cables 40 are pulled to the head 30 by the operation of the head 30. Also, the jamming prevention groove 130 makes the cables 40 to move smoothly.

The length of the jamming prevention groove 130 may be formed to be corresponding to the length of pulling the cable tube 300.

The conveying ring 200 is slidably disposed in the conveying hole 110. The conveying ring 200 moves in front and back directions. The conveying ring 200 includes a through-hole 210 for allowing the control cables 40 to pass through.

The cable tube 300 is a pipe shaped member that integrally houses a plurality of the control cables 40 connected to the arm 20 and the head 30.

The cable tube 300 includes one end inserted into the conveying hole 110 and connected to the conveying ring 200 and the other end connected to the head 30 through the through-hole 121 of the fixing ring 120 connected to the body 100.

The elastic member 400 is a member having elastic force. The elastic member 400 is externally inserted in the inserted part of the cable tube 300, which is inserted in the conveying hole 110 of the body 100. The elastic member 400 includes one end connected to the fixing ring 120 and the other end connected to the conveying ring 200.

It is preferable to use a spring having an elastic power as the elastic member 400. However, the present invention is not limited thereto.

Therefore, the elastic member 400 makes the conveying ring 200 to slide back to an original position using the elastic force although the conveying ring 200 slides forwardly when the cable tube 300 is pulled to the head 30 by the operation of the head 3.

As shown in FIG. 7, the head 30 of the industrial robot 10 rotates, and the cable tube 300 is pulled to the head 30. Then, the force is transferred to the conveying ring 200 connected to the one end of the cable tube 300, and the conveying ring 200 slides to the head, thereby compressing the elastic member 400.

The elastic force of the elastic member 400 returns the conveying ring 200 back to the original position when the head 30 returns to the original position. Then, the cable tube 300 pulled to the head 30 slides back to the original position, thereby preventing the cable tube 300 from being loosen.

Hereinafter, the operation of a cable control apparatus according to an embodiment of the present invention will be described with reference to FIGS. 4 to 8.

At first, the body 100 is disposed an upper rear end of the arm 20 of the industrial robot 10. The cable tube 300 integrally housing a plurality of control cables 40 is connected to one end of the conveying ring 200 internally inserted in the conveying hole 110 of the body 100 and the other end connected to the head 30 of the industrial robot 10.

When the industrial robot 10 rotates the head 30, the cable tube 300 is wound around the head 30 and pulled to the head 30. Then, the conveying ring 200 slides to the head 30 and compresses the elastic member 400.

When the head 30 rotates in the other direction and returns to the original position, the force of pulling the cable tube 300 to the head 30 is released and the conveying ring 200 slides back to the original position due to the elastic force of the elastic member 400.

Accordingly, the cable tube 300 is pulled to the rear end of the arm 20 with the conveying ring 200. As a result, the cable tube 300 is prevented from being loosen, for example, from being entangled and bended. Therefore, the control cables 30 in the cable tube 300 are not damaged.

While the present invention has been described with respect to certain preferred embodiments, it will be apparent to those skilled in the art that various changes and modifications may be made without departing from the scope of the invention as defined in the following claims.

The invention claimed is:

1. A cable control apparatus for preventing a plurality of cables, which are disposed between an arm and a head of the industrial robot, from being entangled or bended to protect the cables from being damaged, the cable control apparatus comprising:

a body disposed above the arm and including a conveying hole formed in a length direction and a fixing ring having a through-hole fixed in the conveying hole;

a conveying ring slidably disposed in the conveying hole of the body and including a through-hole internally inserted therein;

a cable tube for integrally housing a plurality of control cables and including one end connected to the conveying ring with being inserted into the conveying hole of the body and the other end connected to the head of the industrial robot through the through-hole of the fixing ring; and a elastic member externally inserted to the cable tube and including one end connected to the fixing ring and the other end connected to the conveying ring for returning the cable tube to an original position through elastic force after the conveying ring slides the cable tube in order to sustain the cable tube between the arm and head not to be loosen.

2. The cable control apparatus of claim 1, wherein a jamming prevention groove is formed at a rear end of the body in a length direction and the jamming prevention groove communicates with the conveying hole.

3. The cable control apparatus of claim 1, wherein the elastic member is a spring having elastic force.

\* \* \* \* \*